March 7, 1967    R. L. CREMER    3,307,291
PLASTIC AXLE BEARING FOR USE ON TOYS
Filed March 30, 1965
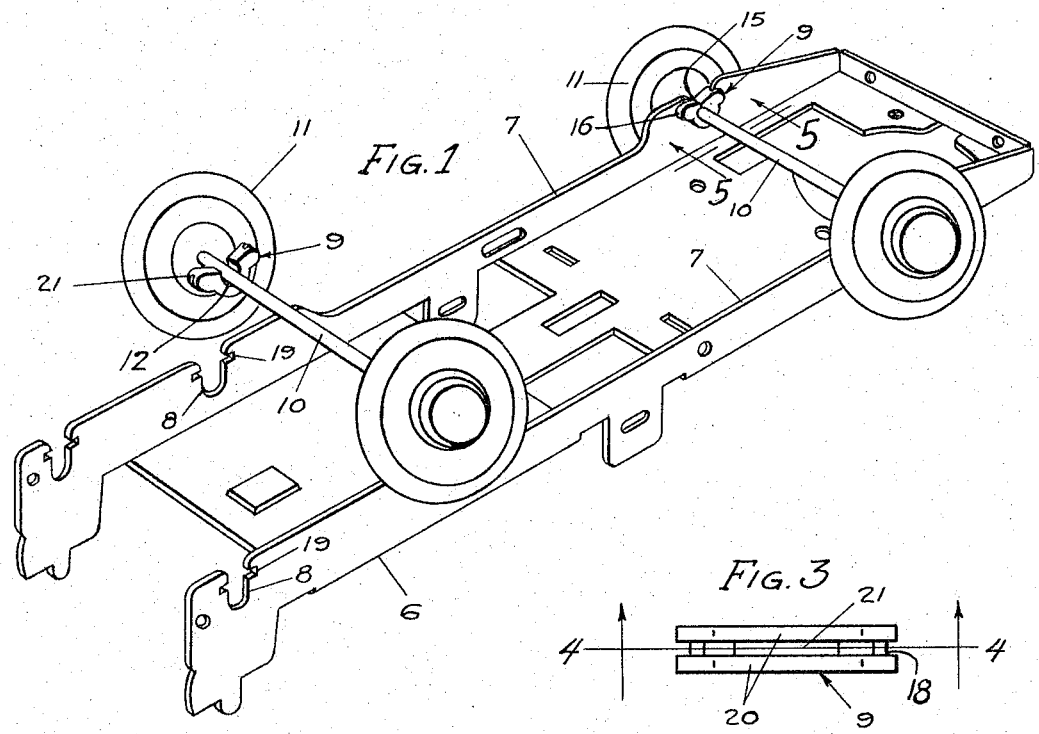
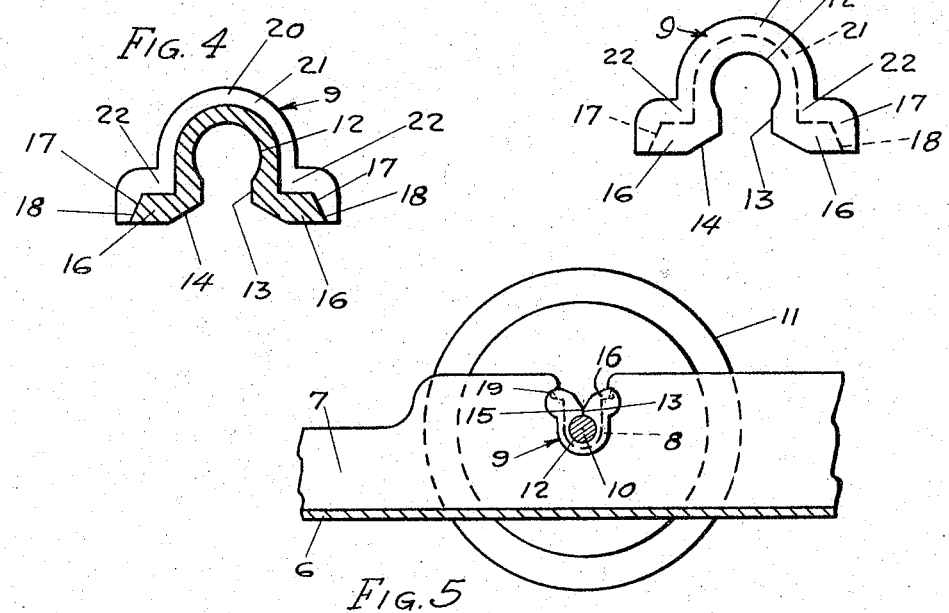
INVENTOR~
Robert L. Cremer

United States Patent Office 3,307,291
Patented Mar. 7, 1967

3,307,291
PLASTIC AXLE BEARING FOR USE ON TOYS
Robert L. Cremer, Freeport, Ill., assignor, by mesne assignments, to King-Seeley Thermos Co., Ann Arbor, Mich., a corporation of Michigan
Filed Mar. 30, 1965, Ser. No. 443,879
13 Claims. (Cl. 46—222)

This invention relates to a snap-in type plastic bearing for use in toy vehicles, the principal advantages derived therefrom being, first of all, greater economy and greater durability, and, secondly, saving in cost of assembling, from the standpoint that this bearing makes possible and practical the preliminary assembling of wheels on the axles before the axles with the bearings snapped thereon are assembled in the slots provided therefor in the chassis and snapped in place therein.

The invention is illustrated in the accompanying drawing, in which

FIG. 1 is a perspective view of a toy vehicle chassis looking at the bottom thereof, showing one axle installed with the present improved type of plastic snap-in bearings and the other axles with the bearings snapped thereon ready to be installed, both axles having their wheels already applied thereto prior to mounting in the chassis;

FIGS. 2 and 3 are enlarged face view and plan view, respectively, of a plastic snap-in type bearing made in accordance with my invention;

FIG. 4 is a longitudinal section taken on the line 4—4 of FIG. 3, and

FIG. 5 is a section on the line 5—5 of FIG. 1 showing the bearing installed in the slot in the chassis, this section showing the parts substantially full size.

The same reference numerals are applied to corresponding parts throughout the views.

Referring to the drawing, the reference numeral 6 designates the sheet metal chassis of a toy vehicle having longitudinally extending flanges 7 in spaced parallel relation along its opposite sides, in which generally U-shaped slots 8 are provided to accommodate the plastic bearings of my invention, indicated generally by the reference numeral 9, to mount the axles 10 on the chassis after the wheels 11 have been assembled on the axles. An appreciable saving in cost of production is thereby realized and a far better grade product is also made possible in this way, as distinquished from prior constructions where the axles had to be assembled in the bearings on the chassis first before the wheels could be applied to the opposite ends. The plastic bearings 9 are not only cheaper than what were used previously but are far better, and they actually up-grade the final toy considerably by virtue of the sound deadening action they give, as distinquished from the tinny or metallic sound given by other toys when the wheels thereof were banged onto the floor.

The bearings 9 are preferably of flexible resilient polyethylene although any other similar resilient flexible plastic material may be used, it being important that the bearings be expansible and compressible radially, expansibility being desirable to enable the preliminary snapping of the bearings on the axle 10 so as to enter the axle in the bearing openings 12, these openings being slightly larger in diameter than the axle 10 so that when the bearings 9 are subsequently compressed radially in forcing the same into the slots 8, the resulting reduction in diameter of the bearing openings 12 will still leave operating clearance for the axle 10 to be free to turn therein as the axles 10 have to turn with their wheels 11 in the operation of the toy vehicle. To facilitate entry of the axle 10 in the bearing opening 12, the radial entrance 13, which is appreciably smaller in width than the diameter of the bearing opening 12, has outwardly diverging sides 14. Hence, one need only apply pressure to the back of the bearing 9 as the axle 10 rides on the diverging surfaces 14, and the bearing 9 will be expanded radially enough for the axle to pass through the slot 13 and snap into place in the bearing opening 12. At this point the axle fits loosely in the bearing opening, but the bearing will not drop off the axle. This facilitates assembling an axle in the chassis, because it is only necessary to align the two bearings 9 with the two slots 8 on opposite sides of the chassis and press downwardly on the axle adjacent the two bearings to force the bearings into place in the slots. In this operation the bearings are compressed radially as the bearings are crowded into the slots 8 until finally the entrance slot 13 in each bearing is completely closed, as indicated at 15 in FIGS. 1 and 5, the final closing up of the bearing being due to the crowding of the laterally extending outer end portions 16 into the entrance of the slot. Finally, the outwardly diverging surfaces 17 on the outer end of the laterally extending portions 16, riding on the opposite sides of the entrance to the slot, cause further compression of the laterally extending portions 16 and also flex the same in outwardly diverging relation, as seen in FIG. 5, and, when the points 18 defined on the outer ends of the laterally extending portions 16 reach the notches 19 in the opposite sides of the slot 8 spaced inwardly from the entrance end, these points 18 snap into place in the notches 19, thereby locking the bearing 9 securely in place, so much so that it is practically impossible to remove the bearing without cutting it up. In any event, a child is not at all apt to find any means of accomplishing removal of the bearings, so this becomes a really permanent assembly for the life of the toy.

Longitudinally extending reinforcing flanges 20 are provided on opposite sides of the bearings 9 and they define an annular groove 21 on the outside of the bearings just wide enough to receive the thickness of metal in the side flanges 7 of the chassis 6, so that each bearing 9 will be firmly guided in its movement into its slot 8 to its finally assembled position and there will be no danger whatsoever of a bearing getting cocked to one side or the other on either side of the slot 8 and failing to be snapped into place properly in the slot in the assembling operation.

In operation, the axles 10 come with the wheels 11 assembled thereon, and in mounting the same on the chassis, the operator snaps a pair of bearings 9 onto each axle and gets the bearings properly located with their annular grooves 21 engaged on the flanges 7 over the open ends of the slots 8, whereupon pressure with a ram or the like bearing against the axle 10 next to the bearings 9 will easily enough force the bearings down into the slots 8 until the points 18 finally snap into place in the notches 19. In the final position, as seen in FIG. 5, the laterally extending portions 16 are disposed in outwardly diverging relationship to one another, and, hence, it is not only the compression of the plastic material endwise of the laterally extending portions 16 but also the stretching of the flanges 20 in the portions 22 at the junction of the U-shaped main body portion of the bearing with the laterally extending portions 16 that account for the tight engagement of the points 18 in the notches 19.

It is believed the foregoing description conveys a good understanding of the objects and advantages of my invention. The appended claims have been drawn to cover all legitimate modifications and adaptations.

I claim:
1. An axle bearing construction comprising, in combination, a bearing support having a generally rectangular opening with an entrance at one edge of said support to accommodate an axle in transverse relation to said support, there being shoulders defined on opposite sides of said opening in the entrance, and generally U-shaped bearing means of flexible, resilient, nonmetallic bearing material to embrace said axle and be entered in said opening with said axle with the cross-portion of the U foremost and the arms of the U extending outwardly so as to engage and be retained at their outer ends behind the aforesaid shoulders.

2. An axle bearing construction as set forth in claim 1 wherein said U-shaped bearing means has portions on opposite faces thereof abutting the bearing support alongside the opening to prevent displacement of said bearing means from said opening axially of said axle.

3. An axle bearing construction as set forth in claim 1 wherein said U-shaped bearing means has lateral projections on the outer ends of the legs of the U on the remote sides thereof which, when crowded into the entrance of the opening in said bearing support, force the legs together to close the bearing opening on said axle while securing the bearing means in place in said bearing support by engagement behind the shoulders in the entrance.

4. An axle bearing construction as set forth in claim 1 wherein the shoulders in the entrance are defined in notches provided in said bearing support on opposite sides of the opening therein, and wherein said U-shaped bearing means has lateral projections on the outer ends of the legs of the U on the remote sides thereof which, when crowded into the entrance of the opening in said bearing support, force the legs together to close the bearing opening on said axle while securing the bearing means in place in said bearing support by engagement in said notches.

5. An axle bearing construction as set forth in claim 4 wherein the lateral projections have outwardly diverging cam surfaces provided on the extremities thereof which, in their sliding engagement on opposite sides of the opening in said bearing support, force the legs of the U together by cam action, these surfaces also defining one side of sharp points on the extremities of the lateral projections which snap into said notches when in register therewith.

6. An axle bearing construction as set forth in claim 1 wherein said U-shaped bearing means has the bearing opening of more than semi-circular form and larger diameter than the axle to be entered therein, whereby, when the legs of the U are closed, in entering the bearing means in the opening, the bearing means is closed and reduced to a diameter only slightly larger than that of the axle.

7. An axle bearing construction as set forth in claim 1 wherein said U-shaped bearing means has longitudinal reinforcing flanges on opposite faces thereof in parallel relation spaced to receive the bearing support closely therebetween and thereby prevent displacement from the opening therein axially of said axle.

8. In combination, a toy vehicle chassis of channel shaped sheet metal construction providing two downwardly projecting longitudinal flanges on opposite sides thereof having vertical slots opening from the lower edges which are in aligned relationship transversely of said chassis, an axle having wheels fixed on its opposite ends and adapted to be mounted in bearing means in said slots for rotation, and two generally U-shaped flexible resilient plastic bearing means made to fit snugly in said slots and each having a bearing opening provided therein defined in part by the cross-portion of the U and in part by the adjoining portions of the legs of the U, said bearing means having annular external grooves provided thereon to receive the flanges with a close fit to guide the bearing means into place in the slots and hold the bearing means against displacement from the slots axially of the axle.

9. In combination, a toy vehicle chassis of channel shaped sheet metal construction providing two downwardly projecting longitudinal flanges on opposite sides thereof having vertical slots opening from the lower edges which are in aligned relationship transversely of said chassis, an axle having wheels fixed on its opposite ends and adapted to be mounted in bearing means in said slots for rotation, and two generally U-shaped flexible resilient plastic bearing means made to fit snugly in said slots and each having a bearing opening provided therein defined in part by the cross-portion of the U and in part by the adjoining portions of the legs of the U, these bearing means being formed of compressible material means whereby said bearing means requires only slight spreading of the legs of the U to enter the axle in the bearing openings to close the bearing openings on the axle, said bearing means having annular external grooves provided thereon to receive the flanges with a close fit to guide the bearing means into place in the slots and hold the bearing means against displacement from the slots axially of the axle.

10. The combination set forth in claim 8 including on each of the U-shaped plastic bearing means lateral projections on the outer ends of the legs of the U on the remote sides thereof which, when crowded into the entrance of the slot in the flange, force the legs of the U together to close the bearing opening on said axle.

11. The combination set forth in claim 8 including on each of the U-shaped plastic bearing means lateral projections on the outer ends of the legs of the U on the remote sides thereof which, when crowded into the entrance of the slot in the flange, force the legs of the U together to close the bearing opening on said axle, said slot having notches provided therein on opposite sides near the entrance end into which said lateral projections engage to lock the bearing means in place in said slot.

12. The combination set forth in claim 8 including on each of the U-shaped plastic bearing means lateral projections on the outer ends of the legs of the U on the remote sides thereof, which, when crowded into the entrance of the slot in the flange, force the legs of the U together to close the bearing opening on said axle, said slot having notches provided therein on opposite sides near the entrance end into which said lateral projections engage to lock the bearing means in place in said slot, the lateral projections having outwardly diverging cam surfaces provided on the extremities thereof which, in their sliding engagement on opposite sides of the slot in the flange, force the legs of the U together by cam action, these surfaces also defining one side of sharp points on the extremities of the lateral projections which snap into said notches when in register therewith.

13. The combination set forth in claim 8 wherein each plastic bearing means has the bearing opening of more than semi-circular form and larger diameter than the axle to be entered therein, whereby, when the legs of the U are closed in entering the bearing means in the slot, the bearing means is closed and reduced to a diameter only slightly larger than that of the axle.

References Cited by the Examiner

FOREIGN PATENTS 1,258,912 3/1961 France.
359,079 1/1962 Switzerland.

RICHARD C. PINKHAM, *Primary Examiner.*

L. J. BOVASSO, *Assistant Examiner.*